(12) United States Patent
Lyons et al.

(10) Patent No.: US 7,972,679 B1
(45) Date of Patent: *Jul. 5, 2011

(54) BALLISTIC-RESISTANT ARTICLE INCLUDING ONE OR MORE LAYERS OF CROSS-PLIED UHMWPE TAPE IN COMBINATION WITH CROSS-PLIED FIBERS

(75) Inventors: Fielder Stanton Lyons, Phoenix, AZ (US); Jeffrey A. Mears, Chandler, AZ (US); Gene C. Weedon, Richmond, VA (US); Kenneth C. Harding, Midlothian, VA (US); Lisa Owen, Charlotte, NC (US); Peter Anthony Russell, Liberty Township, OH (US); Joseph Mitchell, Charlotte, NC (US); Erik Johnson, Phoenix, AZ (US)

(73) Assignee: BAE Systems Tensylon H.P.M., Inc., Monroe, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/592,198

(22) Filed: Nov. 20, 2009

Related U.S. Application Data

(63) Continuation-in-part of application No. 12/455,279, filed on May 29, 2009, which is a continuation-in-part of application No. 11/881,863, filed on Jul. 30, 2007.

(51) Int. Cl.
*B29C 65/00* (2006.01)
*B32B 37/10* (2006.01)
*B32B 37/22* (2006.01)

(52) U.S. Cl. .................. 428/156; 139/383 R; 156/164; 156/194; 156/304.6; 428/107; 428/213; 428/364; 442/135

(58) Field of Classification Search .................. 428/156, 428/107, 213, 364; 139/383; 156/194, 304.6; 429/144; 442/135
See application file for complete search history.

(56) References Cited

U.S. PATENT DOCUMENTS

| | | | |
|---|---|---|---|
| 6,162,746 | A | 12/2000 | Chiou |
| 6,183,834 | B1 | 2/2001 | van der Loo |
| 6,893,704 | B1 | 5/2005 | van der Loo |
| 6,945,155 | B2 | 9/2005 | Cordova et al. |
| 7,393,588 | B1 | 7/2008 | Howland |
| 2002/0037391 | A1* | 3/2002 | Harpell et al. ............. 428/103 |
| 2002/0124900 | A1* | 9/2002 | Khokar ....................... 139/11 |
| 2010/0003452 | A1* | 1/2010 | Jongedijk et al. ......... 428/107 |

FOREIGN PATENT DOCUMENTS

EP 1627719 A1 * 2/2006
* cited by examiner

*Primary Examiner* — Brent T O'Hern

(57) ABSTRACT

A ballistic-resistant molded article having a sandwich-type structure including two outer portions of a first high modulus material surrounding an inner portion of a second high modulus material. The outer portions are comprised of a plurality of interleaved layers of adhesive coated cross-plied non-fibrous ultra high molecular weight polyethylene tape. The inner portion is comprised of a plurality of interleaved layers of high modulus cross-plied fibers embedded in resin. The stack of interleaved layers is compressed at high temperature and pressure to form a hybrid sandwich ballistic-resistant molded article that includes a mix of high modulus materials. It has been found that ballistic resistance is higher for the hybrid structure than for a monolithic structure of comparable areal density.

7 Claims, 2 Drawing Sheets

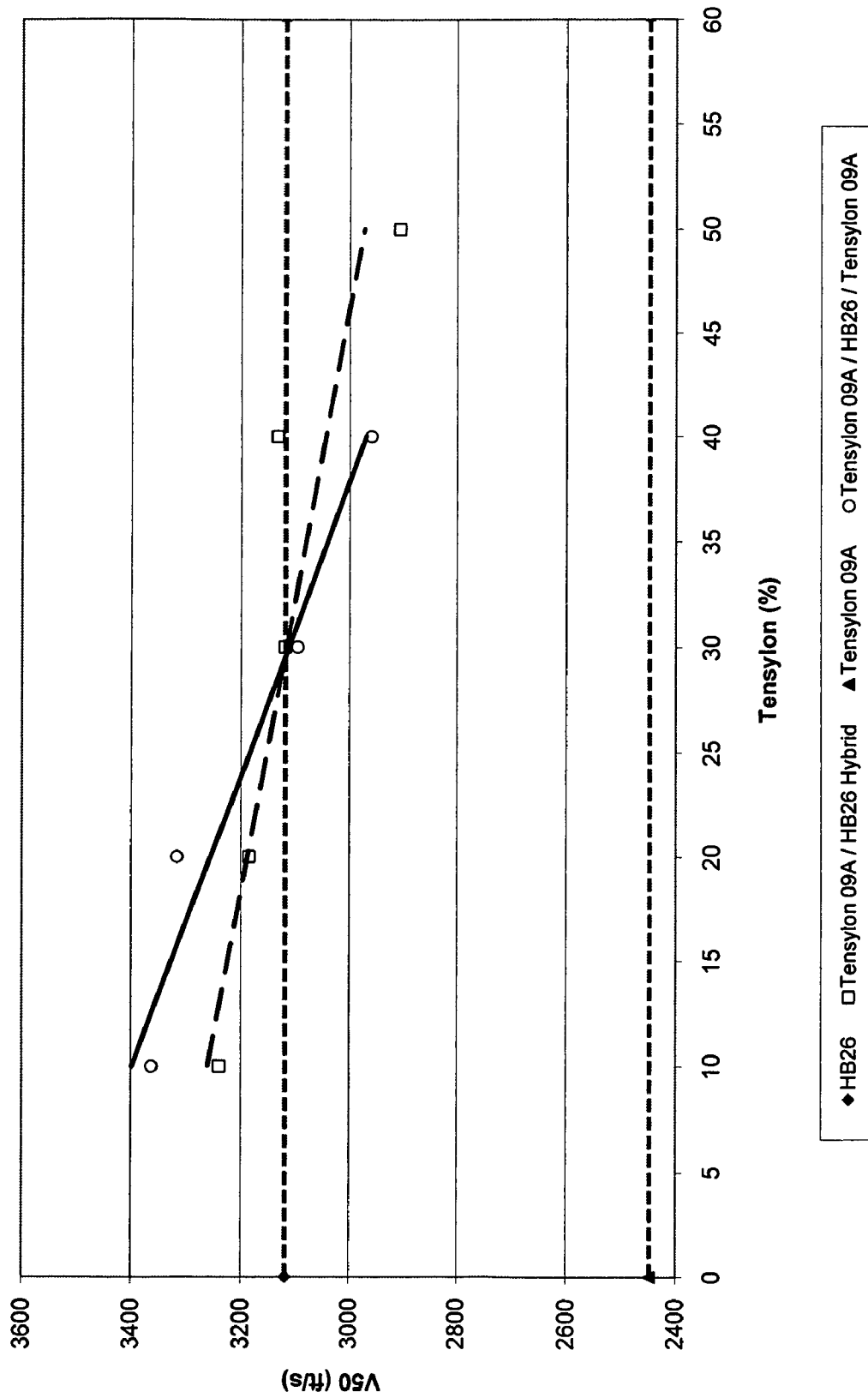

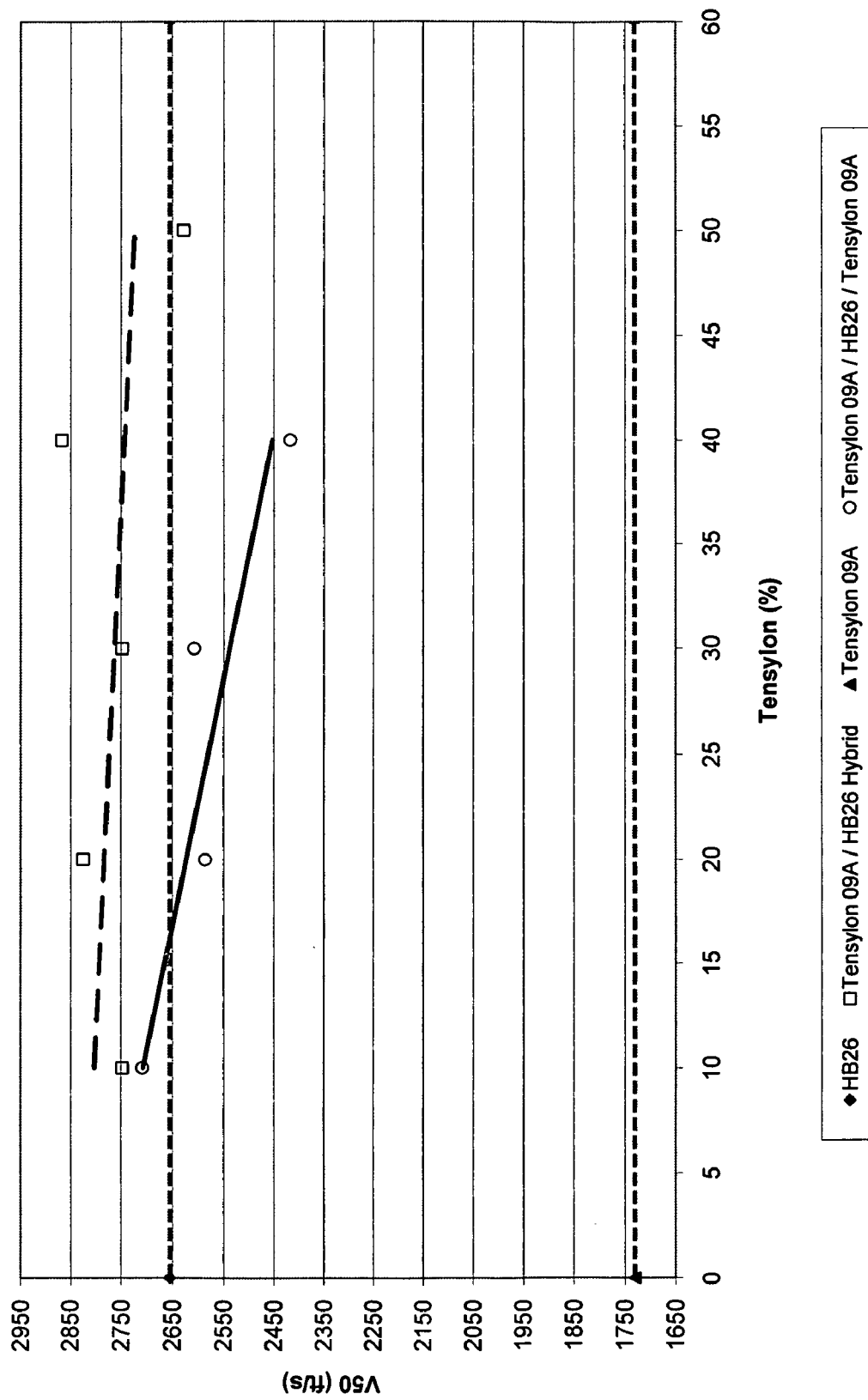
Fig. 2 - Tensylon 09A / HB26 PS Ball Hybrid Construction Comparison Performance (4.28 psf)

BALLISTIC-RESISTANT ARTICLE INCLUDING ONE OR MORE LAYERS OF CROSS-PLIED UHMWPE TAPE IN COMBINATION WITH CROSS-PLIED FIBERS

This application is a Continuation-In-Part of U.S. patent application Ser. No. 12/455,279, filed on May 29, 2009 and entitled "Ballistic-Resistant Panel Including High Modulus Ultra High Molecular Weight Polyethylene Tape", which is a Continuation-In-Part of U.S. patent application Ser. No. 11/881,863, filed on Jul. 30, 2007 and entitled "Ballistic-Resistant Panel Including High Modulus Ultra High Molecular Weight Polyethylene Tape, of which the entire contents of said applications are incorporated herein in their entirety by reference thereto.

FIELD OF THE INVENTION

The present invention relates to survivability enhancement and more particularly to a ballistic-resistant article including a compressed stack of interleaved layers including two outer layers of non-fibrous ultra high molecular weight polyethylene tape and an inner layer of high modulus fibers.

BACKGROUND OF THE INVENTION

U.S. patent application Ser. No. 11/881,863, filed on Jul. 30, 2007, the entire contents of which have been incorporated herein in their entirety by reference thereto, disclosed a ballistic-resistant panel that significantly improved threat performance by providing a strike face consisting of a compressed stack of interleaved layers of non-fibrous ultra high molecular weight polyethylene tape. The non-fibrous ultra high molecular weight polyethylene tape is sold under the trade name TENSYLON® and is produced by BAE Systems Tensylon High Performance Materials, Inc., Monroe, N.C. The strike face, which formed at least 25% by weight of the entire panel, was compressed together with a backing layer of cross-plied fibers embedded in resin. Two types of cross-plied fibers were evaluated in the backing layer, including aramid and ultra high molecular weight polyethylene fibers. Several adhesives were found acceptable for adhering together cross-plied layers of Tensylon tape and the level of adhesive required for adhering the layers of Tensylon tape was significantly less than for a comparable panel constructed strictly of high modulus fibers.

U.S. patent application Ser. No. 12/455,279, filed on May 29, 2009, the entire contents of which have been incorporated herein in their entirety by reference thereto, disclosed additional ballistic-resistant panel constructions including various ratios of non-fibrous ultra high molecular weight polyethylene tape in the strike face to cross-plied polyethylene fibers in the backing layer. The ballistic resistant panels were identified therein as Tensylon/HB26 hybrids. Ballistic resistance was higher for the Tensylon/HB26 hybrids wherein the Tensylon portion comprised at most 30% by weight than for monolithic panels formed of HB26.

Although the hybrid panel construction disclosed in the aforementioned patent application exhibited good resistance against threats, continued tests have provided unexpected and advantageous results. These unexpected results indicate that forming a molded hybrid article consisting of two outer portions of UHMWPE tape and an inner portion of high modulus fibers can provide an additional improvement in survivability.

SUMMARY OF THE INVENTION

The invention is a ballistic-resistant molded article having a sandwich-type structure including two outer portions of a first high modulus material surrounding an inner portion of a second high modulus material. The outer portions are comprised of a plurality of interleaved layers of adhesive coated cross-plied non-fibrous ultra high molecular weight polyethylene tape. The inner portion is comprised of a plurality of interleaved layers of high modulus cross-plied fibers embedded in resin. The stack of interleaved layers is compressed at high temperature and pressure to form a hybrid sandwich ballistic-resistant molded article that includes a mix of high modulus materials. It has been found that ballistic resistance is higher for the hybrid structure than for a monolithic structure of comparable areal density. A molded article including outer portions of non-fibrous ultra cross-plied UHMWPE tape and an inner portion of cross-plied fibers exhibited improved ballistic resistance as compared to monolithic structures containing only cross-plied high modulus fibers.

OBJECTS AND ADVANTAGES

A hybrid ballistic-resistant molded article including two outer portions of adhesive coated non-fibrous cross-plied UHMWPE (ultra high molecular weight polyethylene) tape and an inner portion of high modulus cross-plied fibers embedded in resin according to the present invention includes several advantages over a monolithic molded article, including:

(1) Improved ballistic resistance as compared to the monolithic fiber structure.
(2) The cross-plied non-fibrous UHMWPE tape of the present invention can be produced at a substantially lower price than conventional ballistic fibers thereby exhibiting significant cost savings for replacing a portion of the conventional high modulus fibers with the high modulus tape.
(3) Forming the outer portions of the ballistic-resistant article of monolithic cross-plied UHMWPE tape vastly reduces the number of joints or seams thereby significantly reducing the number of weak spots or seams.
(4) Forming the outer portions of monolithic cross-plied UHMWPE tape provides structural support to the laminate and reduces delamination after a ballistic event.
(5) Processing time and cost for molded articles is significantly reduced in forming interleaved layers of high modulus material. The cross-plied UHMWPE tape of the present invention is formed into a monolithic sheet by weaving tape strips into a woven structure such as a simple basket weave, by simply butting together the strips of tape edge to edge, or by overlapping the edges slightly, and then pressing with pressure, heat and pressure, or by coating with adhesive and pressing. This is vastly simpler and cheaper than forming a sheet from fibers, which requires weaving, knitting, or cross-stitching thousands of individual fiber ends together per layer and embedding each of the fibers in resin in an attempt to minimize joints or seams.
(6) The amount of adhesive required binding the tape portions in a molded article or ballistic laminate is substantially lower than that required for fibers. The smooth surface area of the high modulus tape strips used in the strike-face portion of the ballistic-resistant molded article enables a substantially lower ratio of adhesive to high modulus component than is possible with high modulus fibers. The effectiveness of conventional monolithic fiber ballistic-resistant articles is generally negatively affected by higher adhesive ratios, as the adhesive portion adds weight to the laminate but does not necessarily contribute to the ballistic resistance.

These and other objects and advantages of the present invention will be better understood by reading the following description along with reference to the drawings.

DESCRIPTION OF THE DRAWINGS

FIG. 1 is a graph depicting ballistic resistance against M80 Ball projectile of a series of 3.8 psf molded articles including test results for various ballistic-resistant molded articles including a monolithic fiber structure, a monolithic tape structure, a series of hybrid articles with various ratios of tape strikeface portion to fiber backing portion, and a series of hybrid articles with various ratios of tape outer portion to fiber inner portion.

FIG. 2 is a graph similar to FIG. 1 but depicting ballistic resistance against PS Ball projectile of a series of 4.28 psf molded articles.

DETAILED DESCRIPTION OF THE INVENTION

In parent application Ser. No. 11/881,863, filed on Jul. 30, 2007 and U.S. Ser. No. 12/455,279, filed on May 29, 2009 there were disclosed ballistic-resistant molded articles meeting NIJ standard 0101.03 for Level III armor type and comprised of a compressed stack of interleaved layers of high modulus material. As defined in parent application U.S. Ser. No. 12/455,279, which was incorporated herein in its entirety, the term "high modulus" refers to materials having a modulus eater than 1,000 grams per denier (gpd). The compressed stacks were termed "hybrid" articles as they were comprised of a combination of more than one type of high modulus component. The compressed stacks included a strike face portion having a plurality of interleaved layers of cross-plied non-fibrous UHMWPE tape and a backing portion including a plurality of interleaved layers of cross-plied fibers, either aramid or polyethylene, embedded in resin. Ballistic test results on various hybrid articles indicated that providing a strike face portion including small amounts of interleaved layers of cross-plied non-fibrous UHMWPE tape against a backing portion of cross-plied fibers embedded in resin generally provided improved ballistic resistance over a monolithic article including only one of the high modulus components.

Additional NIJ Certification tests, as shown in Table 4 of the aforementioned parent applications, showed a substantial improvement in ballistic resistance for a "sandwich hybrid" that included an inner portion comprised of a plurality of layers of UHMWPE cross-plied fibers embedded in resin, surrounded by two outer portions comprising a plurality of interleaved sheets of cross-plied non-fibrous UHMWPE tape.

Based on the improved ballistic resistance observed in the parent applications, the current invention tests additional ballistic-resistant molded articles of various compositions, including control articles of monolithic cross-plied non-fibrous UHMWPE tape, control articles of monolithic cross-plied UHMWPE fibers embedded in resin, hybrid articles including a strike face of cross-plied non-fibrous UHMWPE tape and a backing of cross-plied UHMWPE fibers embedded in resin, and a "hybrid sandwich" construction including an inner portion of cross-plied UHMWPE fibers embedded in resin and two outer portions of adhesive coated cross-plied non-fibrous UHMWPE tape. The additional molded articles disclosed herein demonstrate that low ratios of adhesive coated cross-plied non-fibrous UHMWPE tape in the outer portions of the hybrid sandwich articles of a given areal density outperform monolithic articles of a similar areal density.

The highly oriented reinforcing materials used to form the molded articles of the present invention included packages of adhesive coated cross-plied TENSYLON® HTBD-09A, also known as Tensylon 09A tape, available from BAE Systems Tensylon High Performance Materials, Inc., Monroe, N.C., and packages of DYNEEMA® HB26 cross-plied fibers embedded in resin, available from DSM Dyneema B.V., Urmond, the Netherlands.

Each package or ply of Tensylon 09A included two adhesive-coated unidirectional monolayers of tape, with the first monolayer of tape oriented with respect to the second unidirectional monolayer at a 90 degree angle, hereinafter referred to as cross-plied 0/90. Although each unidirectional monolayer of tape within the package was formed of individual tape ends or strips, the strips were bonded or fused together at their edges into a unidirectional or unitape sheet, sheeted, and then cross-plied with additional sheets of adhesive-coated unitape. The cross-plied sheets were molded by heat and pressure into a ballistic laminate. Each Tensylon tape used to form a monolayer sheet included a nominal cross section of 0.0025×1.62 inches and a denier of 19,000. Preferably the tape strips include a width of between 1.0 and 12.0 inches and a thickness of between 0.0015 and 0.0035 inch. The non-fibrous ultra high molecular weight polyethylene tape preferably includes a viscosity-average molecular weight of at least 2,000,000, a modulus of greater than 1400 grams per denier, and a tenacity of at least 14 grams per denier. The non-fibrous UHMWPE tape strips are formed from stretching partially oriented UHMWPE tape to a total draw ratio of 100:1 or greater wherein the draw ratio is defined as the length after stretching divided by the length before stretching and the tape strips include a denier of preferably between 11,700 and 140,400. The cross-plied Tensylon 09A packages included a layer of polyolefin adhesive on one side of each of the monolayers for a total nominal adhesive weight of 5.7 wt %. The adhesive is applied as a scrim or film of adhesive laminated to each of the interleaved monolayers of non-fibrous UHMWPE tape. The adhesive can also be in the form of a liquid dispersion or resinous adhesive dispersed in a solvent applied to one side of the non-fibrous UHMWPE tape. Each package or layer of cross-plied 0/90 Tensylon 09A preferably includes an areal density of 0.015 to 0.040 pounds per square foot and an adhesive content of preferably 2 to 10.4 wt %. Although packages of cross-plied Tensylon 09A were constructed of 2 adhesive-coated unidirectional monolayers, it should be understood that larger packages could be constructed with 4, 6, 8 or more monolayers thereby providing cross-plied packages of higher areal densities to be used in the construction of ballistic-resistant molded articles. In addition to polyolefin, other adhesives found acceptable for bonding the layers of UHMWPE tape included polyamide, ethylene vinylacetate copolymer, polyurethane, ethylene acrylic acid copolymer, polystryrene-isoprene copolymer, and ethylene/methacrylic acid copolymer.

Each package or ply of DYNEEMA® HB26 cross-plied fibers embedded in resin included a composite of four unidirectional monolayers of UHMWPE fibers embedded in polyurethane resin and each oriented at 0°/90°/0°/90° with respect to one another.

Two sets of molded articles were formed for the purpose of measuring their ballistic resistance against various threats. Molded articles were formed in nominal areal densities of 3.8 psf (pounds/square foot) and 4.28 psf. The two target areal densities of the articles, 3.8 psf (18.6 kg/m$^2$) and 4.28 psf (20.9 kg/m$^2$), were targeted to provide resistance to the specific threat. An areal density of 3.8 psf was targeted for molded articles of Tensylon 09A/HB26 evaluated against the M80 ball, and an areal density of 4.28 lb/ft² was targeted for molded articles of Tensylon 09A/HB26 against the PS Ball (Type M1943, a common AK47 threat).

Within each set of molded articles, two monolithic control articles were formed to develop a baseline value for the V50 and SEAT (Specific Energy Absorption of the Target) for an article formed strictly of cross-plied Tensylon 09A (monolithic Tensylon) and an article formed strictly of cross-plied HB26 (monolithic HB26). SEAT is defined as the amount of energy that can be absorbed by a molded article on impact of a projectile per unit areal density of the molded article and is expressed in Joules/(kilogram/square meter). Further within each set of molded articles a series of hybrids were prepared having a strike face of Tensylon and a backing of HB26, with the percentage by weight of Tensylon in the molded article varying in steps from generally 50% Tensylon to 10% Tensylon in graduated increments. A further set of molded articles was prepared of a "hybrid sandwich" structure, in which packages of Tensylon were arranged around a core of HB26. The percentage by weight of Tensylon/HB26/Tensylon in the hybrid sandwich molded article was varied in graduated increments from 20/60/20, 15/70/15, 10/80/10, to 5/90/5 with the numbers referring to the weight percentage of each of the three materials respectively in the molded article.

The procedure to form the molded articles in each set involved laying down the desired amount of plies of each specific material, also defined as cross-plied layers or packages, and bonding the combined stack of high modulus materials at heat and pressure into a molded article or panel. A ply is defined herein as a single cross-plied package or layer of reinforcing material, which can be either TENSYLON® 09A or DYNEEMA®HB26. The length and width of each cross-plied package used in forming the articles was 16×16 inches. A first control article included a monolithic structure comprised of a stack of cross-plied Tensylon 09A packages molded into an article. A second control article included a monolithic structure comprised of a stack of cross-plied HB26 packages molded into an article. A series of hybrid articles were then prepared by laying down the desired number of plies or cross-plied packages of adhesive coated Tensylon 09A to form a strike face portion, laying down the desired number of plies or packages of HB26 cross-plied fibers embedded in resin to form a strike face portion, and then heating and compressing the combined stack to form a hybrid molded article.

The series of hybrid sandwich articles were achieved by laying down the desired number of plies or cross-plied packages of adhesive coated Tensylon 09A to form a first outer portion, laying down the desired number of plies or cross-plied packages of HB26 cross-plied fibers embedded in resin to form an inner portion, laying down the desired number of plies or cross-plied packages of adhesive coated Tensylon 09A to form a second outer portion, and then heating and compressing the combined stack to form a three-tiered molded article having outer portions of Tensylon 09A bonded to an inner portion of HB26.

A key difference between the two types of reinforcing materials, Tensylon 09A and HB26, used in the test articles of the present invention is the cross-section aspect ratio of the individual reinforcing elements that comprise each material. Cross-section aspect ratio is the ratio of the longest to the shortest principal axis of a perpendicular cross-section of the reinforcing element. The individual reinforcing elements in the Tensylon 09A portions disclosed herein preferably include a cross-section aspect ratio of at least 200 and more preferably include a cross-section aspect ratio of at least 400. The individual reinforcing elements in the HB26 portions disclosed herein include a plurality of interleaved cross-plied fibers embedded in resin, with the individual fibers or elements including an aspect ratio of no more than 10.

The prepregs or stacks of cross-plied packages for the sets of molded articles included the areal densities and number of plies of Tensylon 09A (Tens 09A) and HB26 as shown in Tables I and II below.

TABLE I

Composition of 3.8 psf Prepreg:

| ID # | AD (psf) | Material 1 (Strike Face) | Material 2 | Material 3 | Plies Mat 1 | Plies Mat 2 | Plies Mat 3 | Ratio (%) |
|---|---|---|---|---|---|---|---|---|
| 201 | 3.8 | Tens 09A | — | — | 151 | — | — | 100/0* |
| 202 | 3.8 | HB26 | — | — | 71 | — | — | 0/100* |
| 203 | 3.8 | Tens 09A | HB26 | — | 79 | 36 | — | 50/50 |
| 204 | 3.8 | Tens 09A | HB26 | — | 63 | 43 | — | 40/60 |
| 205 | 3.8 | Tens 09A | HB26 | — | 48 | 50 | — | 30/70 |
| 206 | 3.8 | Tens 09A | HB26 | — | 32 | 57 | — | 20/80 |
| 207 | 3.8 | Tens 09A | HB26 | — | 16 | 64 | — | 10/90 |
| 208 | 3.8 | Tens 09A | HB26 | Tens 09A | 33 | 43 | 33 | 20/60/20 |
| 209 | 3.8 | Tens 09A | HB26 | Tens 09A | 25 | 50 | 25 | 15/70/15 |
| 210 | 3.8 | Tens 09A | HB26 | Tens 09A | 17 | 57 | 17 | 10/80/10 |
| 211 | 3.8 | Tens 09A | HB26 | Tens 09A | 8 | 64 | 8 | 5/90/5 |

TABLE II

Composition of 4.28 psf Prepreg:

| ID # | AD (psf) | Material 1 (Strike Face) | Material 2 | Material 3 | Plies Mat 1 | Plies Mat 2 | Plies Mat 3 | Ratio (%) |
|---|---|---|---|---|---|---|---|---|
| 301 | 4.28 | Tens 09A | — | — | 169 | — | — | 100/0* |
| 302 | 4.28 | HB26 | — | — | 80 | — | — | 0/100* |
| 303 | 4.28 | Tens 09A | HB26 | — | 88 | 40 | — | 50/50 |
| 304 | 4.28 | Tens 09A | HB26 | — | 72 | 48 | — | 40/60 |
| 305 | 4.28 | Tens 09A | HB26 | — | 54 | 56 | — | 30/70 |
| 306 | 4.28 | Tens 09A | HB26 | — | 36 | 64 | — | 20/80 |
| 307 | 4.28 | Tens 09A | HB26 | — | 18 | 72 | — | 10/90 |
| 308 | 4.28 | Tens 09A | HB26 | Tens 09A | 36 | 48 | 36 | 20/60/20 |
| 309 | 4.28 | Tens 09A | HB26 | Tens 09A | 27 | 56 | 27 | 15/70/15 |
| 310 | 4.28 | Tens 09A | HB26 | Tens 09A | 18 | 64 | 18 | 10/80/10 |
| 311 | 4.28 | Tens 09A | HB26 | Tens 09A | 9 | 72 | 9 | 5/90/5 |

Each of the prepreg stacks were then processed at 3,000 psi (20.7 MPa), 30 minute soak at temperature. All prepregs were processed at temperatures between 210° F. and 257° F. All data were collected from 16"×16" molded articles. The hybrids were all co-cured, and the interlayer between the Tensylon strike face and the HB26 backing was 3M Type 9485 5 mil pressure sensitive acrylic adhesive, which is available from 3M of St. Paul, Minn. For the practice of the invention, it is preferred that compression pressure is no greater than 3,600 psi (24.8 Mpa). As shown in Table 4 of parent U.S. patent application Ser. No. 12/455,279, hybrid and hybrid sandwich articles were successfully molded at 150 psi. More preferably, compression pressure is between 150 and 3,000 psi (1.0 to 20.7 MPa). For the practice of the invention, it is also preferred that the compressed stack of interleaved layers of high modulus material are compressed and bonded together at a temperature of between 210 and 260 degrees F. (99 and 127° C.).

Tables III and IV hereinbelow present the processing conditions for each prepreg including the ratio by weight of Tensylon 09A and HB26 in each specific portion of the prepreg, the molding pressure and temperature, and the areal density (AD).

TABLE III

Process conditions - 3.8 psf hybrid article:

| ID # | AD (psf) | Material 1 (Strike Face) | Material 2 | Material 3 | Ratio (wt %) | Pressure (psi) | Temp (° F.) |
|---|---|---|---|---|---|---|---|
| 201 | 3.8 | Tens 09A | — | — | 100/0 | 3000 | 210 |
| 202 | 3.8 | HB26 | — | — | 0/100 | 3000 | 257 |
| 203 | 3.8 | Tens 09A | HB26 | — | 50/50 | 3000 | 257 |
| 204 | 3.8 | Tens 09A | HB26 | — | 40/60 | 3000 | 234 |
| 205 | 3.8 | Tens 09A | HB26 | — | 30/70 | 3000 | 234 |
| 206 | 3.8 | Tens 09A | HB26 | — | 20/80 | 3000 | 234 |
| 207 | 3.8 | Tens 09A | HB26 | — | 10/90 | 3000 | 234 |
| 208 | 3.8 | Tens 09A | HB26 | Tens 09A | 20/60/20 | 3000 | 234 |
| 209 | 3.8 | Tens 09A | HB26 | Tens 09A | 15/70/15 | 3000 | 234 |
| 210 | 3.8 | Tens 09A | HB26 | Tens 09A | 10/80/10 | 3000 | 234 |
| 211 | 3.8 | Tens 09A | HB26 | Tens 09A | 5/90/5 | 3000 | 234 |

TABLE IV

Process conditions - 4.28 psf hybrid article:

| ID # | AD (psf) | Material 1 (Strike Face) | Material 2 | Material 3 | Ratio (wt %) | Pressure (psi) | Temp (° F.) |
|---|---|---|---|---|---|---|---|
| 301 | 4.28 | Tens 09A | — | — | 100/0 | 3000 | 210 |
| 302 | 4.28 | HB26 | — | — | 0/100 | 3000 | 257 |
| 303 | 4.28 | Tens 09A | HB26 | — | 50/50 | 3000 | 234 |
| 304 | 4.28 | Tens 09A | HB26 | — | 40/60 | 3000 | 234 |
| 305 | 4.28 | Tens 09A | HB26 | — | 30/70 | 3000 | 234 |
| 306 | 4.28 | Tens 09A | HB26 | — | 20/80 | 3000 | 234 |
| 307 | 4.28 | Tens 09A | HB26 | — | 10/90 | 3000 | 234 |
| 308 | 4.28 | Tens 09A | HB26 | Tens 09A | 20/60/20 | 3000 | 234 |
| 309 | 4.28 | Tens 09A | HB26 | Tens 09A | 15/70/15 | 3000 | 234 |
| 310 | 4.28 | Tens 09A | HB26 | Tens 09A | 10/80/10 | 3000 | 234 |
| 311 | 4.28 | Tens 09A | HB26 | Tens 09A | 5/90/5 | 3000 | 234 |

After compressing the prepregs to form the molded article, ballistic resistance tests were conducted on each sample. Each sample was clamped onto a steel frame and fired at in accordance with NIJ 0108.01. The 3.8 psf molded articles were tested against M80 Ball projectile and the 4.28 psf molded articles were tested against PS Ball projectile. All projectiles were fired at 0 degrees obliquity. The velocities in fps (feet per second) at which 50% of the projectiles failed to penetrate the target ($V_{50}$) and the specific energy absorption of the target (SEAT) were determined for each test condition.

Tables V and VI hereinbelow present 1) the sample number, 2) the composition or ratio of materials in terms of wt %, 3) the threat tested against, 4) one or more V50 results for articles formed of one high modulus component, 3) the V50 test results including the number of shots used to calculate the result, 4) an average V50 for each sample, 5) a calculated V50, 6) the delta V50 which is the difference between the calculated V50 and the actual V50, and the specific energy absorption of the target (SEAT). The calculated V50 was determined by the Rule of Mixtures wherein the property of a composite is proportional to the volume fractions of the materials in the composite, thus the calculated V50 for the 20/60/20 ratio of Tens 09A/HB26/Tens 09A in Table V is V50=0.2 (2448)+0.5 (3119)+0.2 (2448) or $V_{50}$ (calculated)=2851.

TABLE V

Ballistic Resistance Results of the 3.8 psf molded articles evaluated against the M80 Ball with the Tensylon 09A oriented toward the threat:

| ID # | Ratio 09A/HB26 | Threat | V50-1 (fps) | V50-2 (fps) | Average V50 (fps) | Calc. V50 (fps) | Delta V50 (fps) | SEAT (J/(kg/m$^2$)) |
|---|---|---|---|---|---|---|---|---|
| 201 | 100/0 | M80 Ball | 2335 (2) | 2561 (4) | 2448 | — | — | 145.7 |
| 202 | 0/100 | M80 Ball | 3102 (2) | 3136 (2) | 3119 | — | — | 236.6 |
| 203 | 50/50 | M80 Ball | 2931 (2) | 2881 (2) | 2906 | 2784 | +123 | 205.4 |
| 204 | 40/60 | M80 Ball | 3025 (2) | 3241 (2) | 3133 | 2851 | +282 | 238.7 |
| 205 | 30/70 | M80 Ball | 3132 (2) | 3106 (2) | 1872 | 2918 | +201 | 236.6 |
| 206 | 20/80 | M80 Ball | 3185 (2) | — | 3185 | 2985 | +200 | 246.7 |
| 207 | 10/90 | M80 Ball | 3240 (2) | — | 3240 | 3052 | +188 | 255.3 |
| 208 | 20/60/20 | M80 Ball | 2920 (2) | 2998 (4) | 2959 | 2851 | +108 | 212.9 |
| 209 | 15/70/15 | M80 Ball | 3092 (4) | 3099 (4) | 3096 | 2918 | +178 | 233.1 |
| 210 | 10/80/10 | M80 Ball | 3295 (4) | 3336 (4) | 3316 | 2985 | +331 | 267.4 |
| 211 | 5/90/5 | M80 Ball | 3295 (2) | 3430 (2) | 3363 | 3052 | +311 | 275.1 |

TABLE VI

Ballistic Resistance Results of the 4.28 psf molded articles evaluated against the PS Ball with the Tensylon 09A oriented toward the threat:

| ID # | Ratio 09A/HB26 | Threat | V50-1 (fps) | V50-2 (fps) | Average V50 (fps) | Calc. V50 (fps) | Delta V50 (fps) | SEAT (J/(kg/m$^2$)) |
|---|---|---|---|---|---|---|---|---|
| 301 | 100/0 | PS Ball | 1898 (4) | 1564 (2) | 1731 | — | — | 52.6 |
| 302 | 0/100 | PS Ball | 2636 (4) | 2676 (2) | 2656 | — | — | 123.9 |
| 303 | 50/50 | PS Ball | 2554 (4) | 2702 (2) | 2628 | 2194 | +435 | 121.3 |
| 304 | 40/60 | PS Ball | 2815 (2) | 2920 (2) | 2868 | 2286 | +582 | 144.4 |
| 305 | 30/70 | PS Ball | 2674 (2) | 2823 (2) | 2749 | 2379 | +379 | 132.7 |
| 306 | 20/80 | PS Ball | 2799 (4) | 2852 (2) | 2826 | 2471 | +355 | 140.2 |
| 307 | 10/90 | PS Ball | 2689 (4) | 2808 (2) | 2749 | 2564 | +186 | 132.7 |
| 308 | 20/60/20 | PS Ball | 2409 (2) | 2427 (4) | 2418 | 2286 | +132 | 102.7 |

TABLE VI-continued

Ballistic Resistance Results of the 4.28 psf molded articles evaluated against the PS Ball with the Tensylon 09A oriented toward the threat:

| ID # | Ratio 09A/HB26 | Threat | V50-1 (fps) | V50-2 (fps) | Average V50 (fps) | Calc. V50 (fps) | Delta V50 (fps) | SEAT (J/(kg/m$^2$)) |
|---|---|---|---|---|---|---|---|---|
| 309 | 15/70/15 | PS Ball | 2579 (4) | 2637 (4) | 2608 | 2379 | +230 | 119.4 |
| 310 | 10/80/10 | PS Ball | 2557 (4) | 2616 (4) | 2587 | 2471 | +116 | 117.5 |
| 311 | 5/90/5 | PS Ball | 2698 (4) | 2720 (4) | 2709 | 2564 | +146 | 128.9 |

The Delta V50 value can be used as a predictor of the expected effectiveness of forming a molded article of a given areal density and a specific ratio and configuration of Tensylon 09A and HB26 in order to protect against a specific threat. For each hybrid or hybrid sandwich molded article, if the Delta V50 is within plus or minus 50 fps, the Rule of Mixtures is a good predictor of the final V50 value, and there is no statistically significant effect from the manner in which the separate high modulus components are combined in the article. However, if the value of the Delta V50 is significantly greater than +50 fps in any of the test articles, it implies that there is a statistically significant positive effect in combining that specific weight ratio and configuration in a molded article for protection against a threat. A Delta V50 that is greater than +50 fps indicates a higher ballistic resistance result than expected by the Rule of Mixtures and thus an advantageous configuration of high modulus components within the article. A Delta $V_{50}$ that is less than −50 fps indicates a lower ballistic resistance result than expected by the Rule of Mixtures and thus an undesirable configuration of high modulus components within the article.

The ballistic resistance test results in Tables V and VI are shown graphically in FIGS. 1 and 2 respectively, with percent Tensylon 09A in each test condition plotted along the x-axis and V50 along the y-axis. Each of the figures includes the V50 values for 1) the monolithic Tensylon 09A article, 2) the monolithic HB26 article, 3) the hybrid articles including a Tensylon 09A strike face and a backing of cross-plied HB26 fibers, and 4) the hybrid sandwich articles including two outer portions of Tensylon 09A and an inner portion of cross-plied HB26 fibers. In each figure, a regression line is fitted to the set of data on each hybrid molded article having a strike face of Tensylon 09A and a backing of HB26 (dashed line) and a second regression line is fitted to the molded article having a hybrid sandwich construction with Tensylon 09A on both sides of the HB26 (solid line).

All of the regression lines in FIGS. 1 and 2 indicate that the ballistic resistance of a molded article can be increased above that of the monolithic structures by combining cross-plied non-fibrous UHMWPE Tensylon 09A tape and cross-plied fibers embedded in resin. The Tensylon 09A can be used as a strike face to improve the ballistic resistance of the molded article or can be added to the outer portions of a sandwich to create a hybrid structure having improved ballistic resistance over a similar structure constructed entirely of cross-plied fibers embedded in resin. As shown in FIG. 1, which depicts the V50 results for the 3.8 psf molded article tested against M80 Ball threat, the regression lines indicate that the ballistic resistance is improved by addition of the Tensylon 09A at levels of about 30 wt % Tensylon 09A and lower for both the hybrid structure having a strike face of Tensylon 09A (dashed line) and for the hybrid sandwich structure having outer portions of Tensylon 09A (solid line). A similar trend is apparent for the 4.28 psf molded article (FIG. 2), with ballistic resistance higher when Tensylon 09A is substituted for a portion of the cross-plied fibers embedded in resin. For the 4.28 psf molded article tested against PS Ball threat (FIG. 2), the regression lines indicate that the ballistic resistance is improved by addition of the Tensylon 09A at levels of about 50 wt % Tensylon 09A and lower for the Tensylon 09A/HB26 hybrid (dashed line) having a strike face of Tensylon 09A and at levels of about 15 wt % Tensylon 09A and lower for the Tensylon 09A/HB26/Tensylon 09A hybrid sandwich having outer portions of Tensylon 09A (solid line).

The results indicate that the SEAT of a ballistic-resistant molded article can be surprisingly increased by combining a small portion of interleaved layers of Tensylon 09A cross-plied non-fibrous ultra high molecular weight polyethylene tape with interleaved layers of cross-plied fibers embedded in resin. As an example, for a 3.8 psf hybrid molded article with 10 wt % Tensylon 09A/90 wt % HB26 the SEAT for M80 Ball projectile weighing 9.72 grams is 255.3 J/(kg/m$^2$) versus 236.6 J/(kg/m$^2$) for the monolithic HB26 molded article, which equates to a 7.9% increase in the SEAT. As a further example, for a hybrid sandwich molded article with 5 wt % Tensylon 09A/90 wt % HB26/5 wt % Tensylon 09A the SEAT for M80 Ball projectile weighing 9.72 grams is 275.1 J/(kg/m$^2$) versus 236.6 J/(kg/m$^2$) for the monolithic HB26 molded article, which equates to a 16.2% increase in the SEAT. Similarly, for a 4.28 psf hybrid molded article with 10 wt % Tensylon 09A/90 wt % HB26 the SEAT for PS Ball projectile weighing 9.72 grams is 132.7 J/(kg/m$^2$) versus 123.9 J/(kg/m$^2$) for the monolithic HB26 molded article, which equates to a 7.1% increase in the SEAT. As a further example, for a hybrid sandwich molded article with 5 wt % Tensylon 09A/90 wt % HB26/5 wt % Tensylon 09A the SEAT for PS Ball projectile weighing 9.72 grams is 128.9 J/(kg/m$^2$) versus 123.9 J/(kg/m$^2$) for the monolithic HB26 molded article, which equates to a 4.0% increase in the SEAT.

In addition to the potential increase in ballistic resistance provided by the hybrid molded articles of the present invention, significant cost savings can be realized by using Tensylon cross-plied tape in place of cross-plied fibers embedded in resin. With a cross-section aspect ratio of at least 400, the tape requires substantially less adhesive weight per package of cross-plied tape. As an example, the cross-plied tape packages are molded together into a sheet and therefore only a thin film of adhesive need be applied to the outer surfaces of the sheet in preparation for use in a ballistic laminate. Adhesive levels as low as 5.7 wt % by weight of the cross-plied tape package have been shown to be satisfactory. In contrast to this, as a result of their low cross-section aspect ratio and high surface area, packages of cross-plied fibers must be embedded in large amounts of resin, typically about 30% by weight, to bind the small fibers within the package. The high adhesive content in packages of cross-plied fibers adds significantly to the cost but does not contribute to the ballistic resistance of the molded product. Substituting Tensylon cross-plied tape for a portion of the cross-plied fibers in a laminate therefore reduces adhesive content and reduces ingredient costs.

Furthermore, substituting cross-plied tape with a large cross-section aspect ratio of 400 for cross-plied fibers with a cross-section aspect ratio of at most 10 leads to significant reduction in processing time and cost. In the 16-inch×16-inch packages of cross-plied tape, typically only 20 ends of tape are required to form the cross-plied package. As a result of the small cross section of the fibers, each cross-plied package of fibers contains thousands of ends of fiber, all of which must be arranged tightly together and embedded in resin to minimize any gaps between the fibers. Any gap can lead to a weak spot and potential failure against the threat in the eventual ballistic-resistant molded article. Significant processing time and expense is realized in handling all of the thousands of fiber ends to form a cross-plied package of fibers.

The test results herein indicated that hybrid molded articles in accordance with the present invention met ballistic resistance standards for non-body armor in accordance with NIJ 0108.01. Similar threat levels or standards, such as NIJ 0101.06 for body armor and STANAG 4569 specifying Protection levels for Occupants of Logistic and Light Armoured Vehicles, would also benefit from armor construction in accordance with the hybrid and hybrid sandwich constructions presented herein.

Based on previous tests disclosed in the parent patent applications, it is believed that comparable ballistic-resistant molded articles according to the present invention could be achieved with Tensylon HTBD-21D as the cross-plied tape component and with Dyneema HB2 or Dyneema HB25 as the cross-plied fibers component embedded in resin. Tensylon HTBD-14D is also believed to be suitable as the cross-plied tape component in a ballistic-resistant hybrid according to the present invention.

Constructing ballistic-resistant molded articles with portions of cross-plied tape packages according to the present invention can substantially reduce the overall cost of the molded laminate. As an example, for the 3.8 psf hybrid article with 30/70 Tensylon/HB26 ratio (sample ID#205 in Table I) and for the 3.8 psf hybrid sandwich article with 15/70/15 Tensylon/HB26/Tensylon (sample ID#209 in Table I), the production cost is reduced by approximately 14%.

Having thus described the invention with reference to a preferred embodiment, it is to be understood that the invention is not so limited by the description herein but is defined as follows by the appended claims.

What is claimed is:

1. A ballistic-resistant molded article comprising:
   a compressed stack of interleaved layers of material having a modulus of greater than 1,000 grams per denier;
   said compressed stack of interleaved layers including two outer portions and an inner portion;
   said outer portions of said compressed stack including a plurality of interleaved layers consisting of cross-plied non-fibrous ultra high molecular weight polyethylene (UHMWPE) tape;
   said outer portions of said compressed stack include an adhesive layer on at least one side of each of said layers of said cross-plied non-fibrous UHMWPE tape; and
   said inner portion of said compressed stack including a plurality of interleaved layers consisting of cross-plied fibers embedded in resin.

2. The ballistic-resistant molded article of claim 1 wherein
   each of said layers of cross-plied non-fibrous ultra high molecular weight polyethylene tape in said outer portions include a plurality of tape strips;
   said tape strips include edges; and
   said tape strips are fused together at said edges.

3. The ballistic-resistant molded article of claim 2 wherein said non-fibrous ultra high molecular weight polyethylene tape includes
   a viscosity-average molecular weight of at least 2,000,000;
   a modulus of greater than 1400 grams per denier; and
   a denier of at least 6,000.

4. The ballistic-resistant molded article of claim 1 wherein each of said layers of cross-plied non-fibrous ultra high molecular weight polyethylene tape includes
   a first layer of unidirectional tape strips bonded together at their edges;
   a second layer unidirectional tape strips bonded together at their edges; and
   said tape strips in said first and second layers are at an angle of 90 degrees with respect to each other.

5. The ballistic-resistant molded article of claim 1 wherein said adhesive on each of said interleaved layers of said non-fibrous ultra high molecular weight polyethylene tape is selected from the group consisting of polyamide, polyolefin, ethylene vinylacetate copolymer, polyurethane, ethylene acrylic acid copolymer, polystryrene-isoprene copolymer, or ethylene/methacrylic acid copolymer.

6. The ballistic-resistant molded article of claim 1 wherein said adhesive layer is a scrim or film of adhesive laminated to each of said interleaved layers of non-fibrous ultra high molecular weight polyethylene tape.

7. The ballistic-resistant molded article of claim 1 wherein
   each of said layers of said cross-plied non-fibrous ultra high molecular weight polyethylene tape includes two sides; and
   said adhesive layer is in the form of a resinous adhesive dispersed in a solvent applied to one side of said non-fibrous UHMWPE tape.

* * * * *